M. SLOTKIN.
VELOCIPEDE.
APPLICATION FILED OCT. 29, 1908.
946,280.
Patented Jan. 11, 1910.
2 SHEETS—SHEET 1.
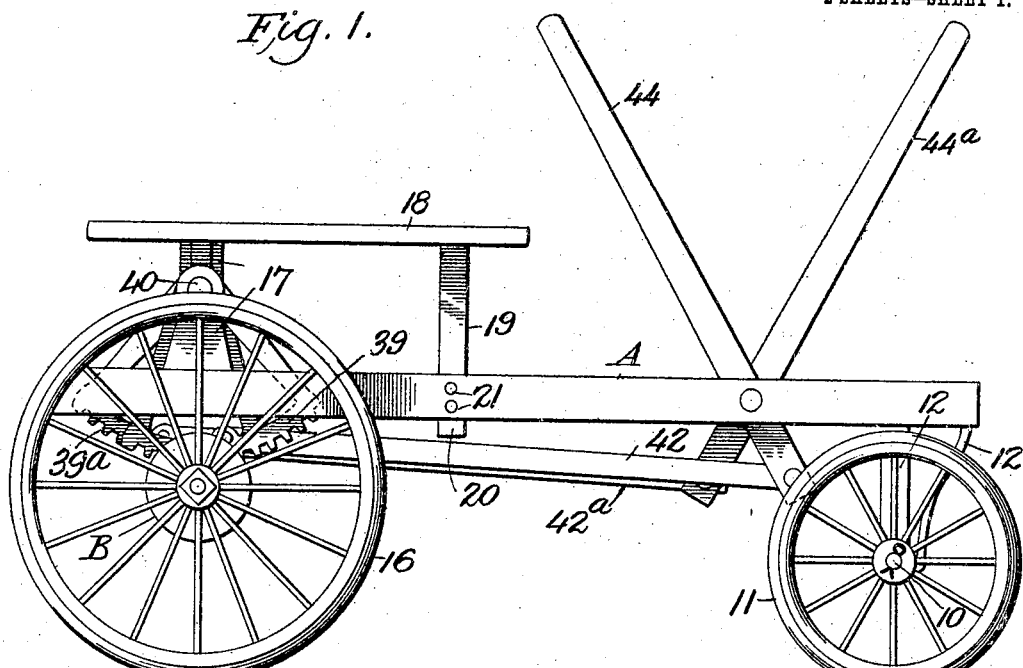
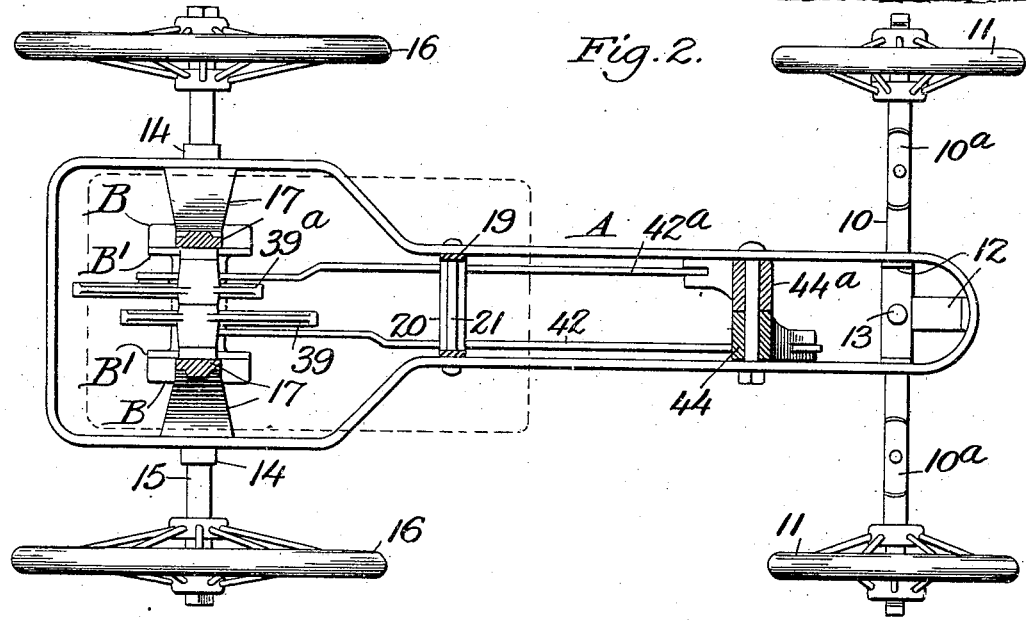
WITNESSES
James F. Duhamel
Henry Hunnedy
INVENTOR,
Mayer Slotkin,
BY
ATTORNEYS M. SLOTKIN.
VELOCIPEDE.
APPLICATION FILED OCT. 29, 1908.
946,280.
Patented Jan. 11, 1910.
2 SHEETS—SHEET 2.
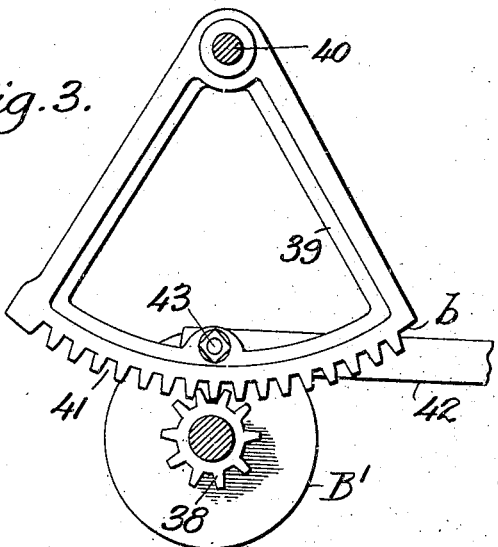
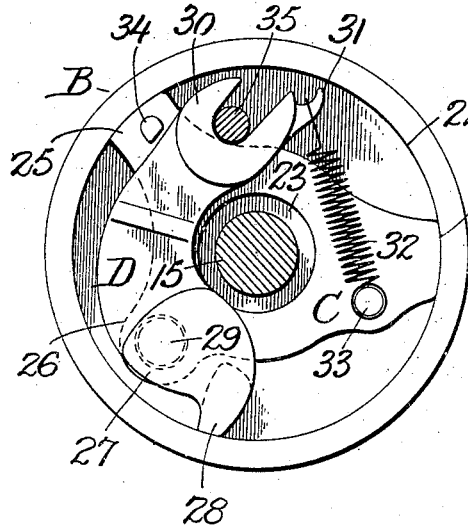
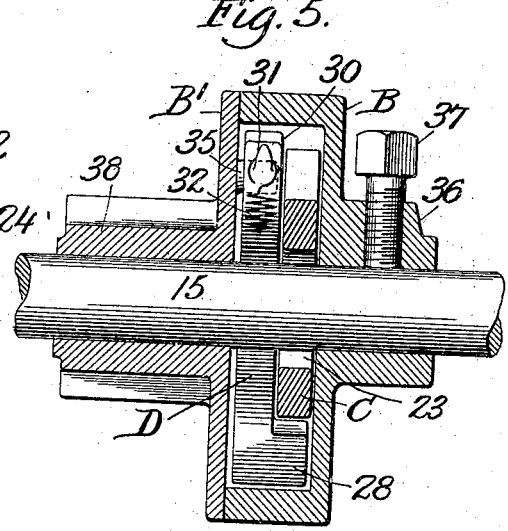
WITNESSES
INVENTOR,
Mayer Slotkin,
BY 
ATTORNEYS.

UNITED STATES PATENT OFFICE.

MAYER SLOTKIN, OF NEW YORK, N. Y.

VELOCIPEDE.

946,280. Specification of Letters Patent. Patented Jan. 11, 1910.

Application filed October 29, 1908. Serial No. 460,161.

*To all whom it may concern:*

Be it known that I, MAYER SLOTKIN, a citizen of the United States, residing at New York city, borough of Manhattan, county of New York, and State of New York, have invented certain new and useful Improvements in Velocipedes, of which the following is a specification.

The invention relates to an improvement in lever or pedal propelled vehicles particularly that class of vehicles known as velocipedes.

The purpose of the invention is to provide a very simple and inexpensive, yet a strong and reliable clutch mechanism, whereby through the medium of the clutch which is of the friction type and coöperating rack and pinion, lever or pedal operated, a continuous movement can be imparted to the driving axle of the vehicle, and wherein when two clutches and accompanying parts are employed the forward motion of the vehicle will be positively uninterrupted, and when a single clutch is used the momentum of the vehicle after one movement of the pedal or lever will carry the vehicle forward until the clutch is again brought into active operation.

It is a further purpose of the invention to reduce the number of parts of the clutch to a minimum, and in the use of the limited number of parts to obtain a maximum of frictional engagement in operation, and to overcome a dead center.

Another purpose of the invention is to provide means for limiting the forward or working throw of the lever or pedal employed, and also to so construct the rack or racks used, that when at the end of the working stroke, the rack or racks will have no influence upon the clutch or clutches, enabling the vehicle to be readily and uninterruptedly moved backward at such time.

In the drawings that illustrate my invention, I have shown the preferred construction of clutch and operating means; but I desire it to be understood that the details may be varied to suit conditions.

In the drawings—Figure 1 is a side elevation of a velocipede having the improvement applied; Fig. 2 is a sectional plan view of the velocipede; Fig. 3 is a detail view of a clutch and rack sector and link for operating the clutch, the axle appearing in section and the view being taken upon an enlarged scale; Fig. 4 is a face view of the clutch with the pinion carrying plate removed, the axle appearing in section and the view being taken upon an enlarged scale; and Fig. 5 is a transverse section through the clutch also drawn upon an enlarged scale.

The frame A, may be of any desired type; as shown, it is of skeleton construction and is made narrower at the front than at the rear. The forward axle is shown as provided with foot rests $10^a$, to facilitate steering, and carries any desired style of supporting wheels 11. The said forward axle 10, is connected by a king bolt 13 with a hanger that extends down from the front of the frame A. Hangers 14, extend down from the sides of the rear portion of the frame, terminating in bearings, in which the rear axle 15, is mounted to freely turn, and said rear axle 15, has supporting wheels 16, secured thereto, the forward wheels 11, being loosely mounted upon the said forward axle. Standards 17, are carried upward from the rear portion of the frame A, above the rear axle 15, and said standards in part support a seat 18, additionally supported by an arch 19, or its equivalent, secured to the frame. Usually, but not necessarily, a strap 20, is secured to the frame extending more or less below it and at such point the frame A is generally provided with braces 21. The purpose of the said strap will be hereinafter set forth and any substitute therefor, may be used.

One or more clutches are employed to operate the driving axle 15, and each clutch employed, is of the following construction, consisting mainly of a barrel section B, adapted for attachment to the axle, a plate section B', that is loosely mounted upon the axle, as is shown in Fig. 5, and a passive grip section C, and coöperative active grip sections D, both of which grip sections are contained in the barrel section B, and operate loosely around the axle 15, as is shown in Fig. 4.

The passive grip section C, is of substantially triangular shape, and two opposing points 24, and 25, constitute bearing points, being in the operation of the clutch brought into or from frictional engagement with the inner peripheral surface 22, of the drum B, by the action of the active grip section D. The third point 26, of the passive grip section C, as is shown in dotted lines in Fig. 4, is out of contact with the aforesaid marginal surface 22, of the drum, and is provided with an aperture 27; and in the further construction of the passive grip section C, an opening 23, is about centrally produced, that permits said grip section in operation from engaging with the axle 15. The active grip section D, of a clutch is of more or less segmental form and rests and has movement upon the passive section C, partially encircling, yet being free of the driving axle 15, as is shown in Fig. 4. The said active grip section D, is provided with a stud 29, that loosely enters the aperture 27, in the passive grip section C, shown best in Fig. 4, and adjacent to the said stud 29; the said active grip section D, is provided with a bearing point or surface 28, that is quite wide extending preferably the depth of the passive section C, as is shown in Fig. 5, and said bearing or contact point 28, is in engagement with the peripheral surface 22, of the clutch barrel B. Thus it will be observed that while the interior mechanism of a clutch consists of but practically two parts, said parts present three bearing or contact points 24, 25, and 28.

In the further construction of the active grip section D, in the end opposite that having the contact point 28, a recess is provided rendering said end 30, bifurcated, and at said bifurcated portion of said section D, a spur 31, is formed to which one end of a spring 32, is attached, the other end of the spring being fastened to a stud 33, carried by the passive grip section C, as is shown in Fig. 4. The spring 32, normally holds the contact point or nose of the active grip section D, in engagement with the peripheral surface 22, of the clutch drum section B, and the outward movement of the bifurcated end of said section D, is limited by a stud 34, at the bearing points 25, of the passive grip section C, as is also best shown in Fig. 4. As stated the plate section B', of a clutch that closes the open side of the barrel section B, is loosely mounted upon the axle 15, and is provided with a pin 35, that enters the slot at the bifurcated end of the active grip section D, while the hub 36, of the barrel section B, is secured to the axle 15, by a screw 37, or its equivalent. The plate section B' of each clutch is also provided with an attached or integral pinion 38, and each pinion 38, meshes with the teeth 41, of a sector, the two said sectors illustrated being designated as 39, and 39ª. These sectors are mounted upon a fixed shaft 40, carried preferably by the standards 17, as is shown in Fig. 2. A blank space b is provided at the forward end of the rack surface of each sector 39, and 39ª, so that when a sector is at the limit of its rearward movement having completed its work of rotating a clutch and the axle 15, said rack surface of the sector will be free from the engaging pinion 38, and the vehicle may be moved backward without hindrance. During the entire forward stroke or movement of a sector, the clutch plate B', acted upon, will be turned in such direction that the pin 35 will force the bifurcated end 30, of the active grip section D, toward the axle 15, thus bringing the contact points 28, thereof in firm frictional engagement with the barrel. Such action will also cause the said active grip section D, through the stud 29, to so act upon the passive grip section C, as to bring the contact points 24 and 25, of said section C, in binding engagement with the peripheral surface of the barrel B, and said barrel will be revolved together with the axle 15, causing the vehicle to be moved forwardly. During the return or rearward stroke of a sector 39, or 39ª, the pin 35, will have reverse action upon the grip section D, and the two sections C, and D, will be released from binding engagement with the barrel B, and will simply turn therein without action thereon.

The sector may be operated in any desired manner, and one or more may be employed. In the drawings two sectors and accompanying clutches are shown and each sector has a connecting rod pivoted thereto, about centrally between the ends of its rack surface, the rods being designated as 42, and 42ª, and the pivots are designated as 43. Each connecting rod is pivoted to a hand lever suitably mounted on the frame A, which levers are respectively designated as 44, and 44ª; but pedals or their equivalents may be substituted if desired.

In the operation of the machine, when the lever or levers 44, and 44ª, are employed, their movements are limited by reason of the connecting rods 42, and 42ª, engaging with the strap 20, particularly when the levers are thrown forward and when the sectors are at the limit of their rearward movement.

I have denominated the part C, a passive grip section, since it is to be acted upon, and the part D, an active grip section, since it acts upon the section C.

What I claim as new and desire to secure by Letters Patent is:—

1. In a vehicle, the combination of an axle, a barrel secured on the said axle, a barrel cover mounted to rotate loosely on the said axle, a pinion on the said cover, a rack engaging the said pinion, means for operating the said rack, a passive grip section loosely contained in the said barrel and having bearing points adapted to engage the inner surface of the barrel, and an active grip section pivotally connected with the said passive grip section and engaged by the said cover, the said active grip section having a bearing point adapted to engage the inner surface of the barrel.

2. In a vehicle, the combination of an axle, a barrel secured on the said axle, a barrel cover mounted to rotate loosely on the said axle, a pinion on the said cover, a rack engaging the said pinion, means for operating the said rack, a passive grip section loosely contained in the said barrel and having bearing points adapted to engage the inner surface of the barrel, an active grip section pivotally connected with the said passive grip section and engaged by the said cover, the said active grip section having a bearing point adapted to engage the inner surface of the barrel, and a spring connecting the said grip sections with each other.

3. In power transmitting devices for velocipedes and like vehicles, the combination with a drive shaft, a barrel secured thereto, a cover section for the barrel, loosely mounted on said shaft, a pinion connected with said cover section, a rack engaging said pinion, and means for operating the rack, of a passive grip section loosely contained in the said barrel section, an active grip section movable upon the said passive section, a pivotal connection between the two grip sections, and a connection between the said cover section for the barrel and the said active section within said barrel.

4. In power transmitting devices, the combination with a shaft, a barrel secured to the shaft, a cover plate for the barrel loosely mounted on the shaft, a pinion secured to said cover plate, and a sector toothed for engagement with the pinion and provided with a toothless space at one end of its toothed surface, of a substantially triangular passive grip section loosely mounted in the said barrel, an active grip section spring controlled and pivoted upon the passive grip section, and an actuating connection between the said cover plate and the said active grip section.

5. In power transmitting devices for velocipedes and like vehicles, the combination with a wheel supported frame, a driving axle for the frame and a clutch carried by the axle, which clutch consists of a barrel secured upon the axle, a cover plate for the barrel loosely mounted upon the axle and provided with a pinion, a passive grip section having a multiple of bearing points loosely mounted in the barrel section, an active grip section pivotally attached to the passive grip section, and a connection between the active grip section and the cover plate for the barrel, of a sector pivoted upon the frame toothed for engagement with the said pinion and provided with a blank space at an end of its toothed surface, a lever, a connecting rod pivoted to the lever and the sector, and a stop device carried by the frame limiting the movement of said connecting rod.

In witness whereof I have hereunto signed my name in the presence of two subscribing witnesses.

MAYER SLOTKIN.

Witnesses:
 J. FRED ACKER,
 MORRIS FLOREA.